(12) United States Patent
Barnes et al.

(10) Patent No.: US 10,030,194 B2
(45) Date of Patent: Jul. 24, 2018

(54) METHOD FOR ENHANCED HYDROCARBON RECOVERY

(71) Applicant: SHELL OIL COMPANY, Houston, TX (US)

(72) Inventors: Julian Richard Barnes, Amsterdam (NL); James Laurel Buechele, Houston, TX (US); Hendrik Dirkzwager, Elburg (NL); Robert Hardy Ellison, Katy, TX (US); Johan Paul Smit, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 14/399,205

(22) PCT Filed: May 8, 2013

(86) PCT No.: PCT/EP2013/059567
§ 371 (c)(1),
(2) Date: Nov. 6, 2014

(87) PCT Pub. No.: WO2013/167646
PCT Pub. Date: Nov. 14, 2013

(65) Prior Publication Data
US 2015/0129227 A1 May 14, 2015

(30) Foreign Application Priority Data

May 9, 2012 (EP) .................................... 12167226

(51) Int. Cl.
*E21B 43/16* (2006.01)
*C09K 8/584* (2006.01)

(52) U.S. Cl.
CPC .............. *C09K 8/584* (2013.01); *E21B 43/16* (2013.01)

(58) Field of Classification Search
CPC ...................................................... C09K 8/584
(Continued)

(56) References Cited

U.S. PATENT DOCUMENTS

| 4,183,867 A | 1/1980 | Sekiguchi et al. |
| 4,248,793 A | 2/1981 | Sekiguchi et al. |

(Continued)

FOREIGN PATENT DOCUMENTS

| EP | 0351928 | 1/1990 |
| EP | 0377261 | 7/1990 |

(Continued)

OTHER PUBLICATIONS

Toxicological Profile for 2-Butoxyethanol and 2-Butoxyethanol Acetate (Dpt. of HHS 1998) pp. 277-278.*

(Continued)

*Primary Examiner* — Angela M DiTrani

(57) ABSTRACT

The invention relates to a method of treating a hydrocarbon containing formation, comprising the following steps: a) preparing an internal olefin sulfonate, comprising sulfonating an internal olefin into sulfonated internal olefin followed by contacting sulfonated internal olefin with a base containing solution resulting in the internal olefin sulfonate, wherein sulfonated internal olefin is contacted with the base containing solution in the presence of a non-ionic surfactant, and/or after step a) but before step b), the internal olefin sulfonate and said non-ionic surfactant are combined; b) transporting an aqueous solution comprising the internal olefin sulfonate and the non-ionic surfactant to the location of the hydrocarbon containing formation; c) providing the internal olefin sulfonate and the non-ionic surfactant to at least a portion of the hydrocarbon containing formation; and (Continued)

d) allowing the internal olefin sulfonate and the non-ionic surfactant to interact with the hydrocarbons in the hydrocarbon containing formation.

15 Claims, 4 Drawing Sheets

(58) Field of Classification Search
USPC .................................................. 166/305.1
See application file for complete search history.

(56) References Cited

U.S. PATENT DOCUMENTS

| | | | |
|---|---|---|---|
| 4,597,879 A | | 7/1986 | Morita et al. |
| 4,733,728 A | * | 3/1988 | Morita .................. C09K 8/584 |
| | | | 166/270.1 |
| 4,979,564 A | | 12/1990 | Kalpakci et al. |
| 5,068,043 A | | 11/1991 | Thigpen et al. |
| 5,510,306 A | | 4/1996 | Murray |
| 5,633,422 A | | 5/1997 | Murray |
| 5,648,584 A | | 7/1997 | Murray |
| 5,648,585 A | | 7/1997 | Murray et al. |
| 5,849,960 A | | 12/1998 | Singleton et al. |
| 2009/0203557 A1 | | 8/2009 | Barnes et al. |
| 2010/0282467 A1 | * | 11/2010 | Hutchison ............. C07C 303/06 |
| | | | 166/305.1 |
| 2011/0281779 A1 | * | 11/2011 | Weerasooriya ........ C09K 8/584 |
| | | | 507/254 |
| 2015/0073168 A1 | * | 3/2015 | Barnes .................. C07C 303/06 |
| | | | 558/55 |

FOREIGN PATENT DOCUMENTS

| | | |
|---|---|---|
| EP | 0482687 A1 * | 9/1991 ............... C11D 1/14 |
| EP | 0482687 | 4/1992 |
| EP | 0830315 | 3/1998 |
| GB | 2135713 | 9/1984 |
| GB | 2138866 | 10/1984 |
| WO | 2004081342 | 9/2004 |
| WO | 2009100224 | 8/2009 |
| WO | 2009100301 | 8/2009 |
| WO | 2011100301 | 8/2009 |
| WO | 2011005746 A1 | 1/2011 |
| WO | 2011098493 | 8/2011 |
| WO | 2011100301 | 8/2011 |

OTHER PUBLICATIONS

Schlumberger Oilfield glossary, "Enhanced Oil Recovery," retrieved Aug. 8, 2017 from http://www.glossary.oilfield.slb.com/Terms/e/enhanced_oil_recovery.aspx.*
Schlumberger Oilfield glossary, "reservoir," retrieved Aug. 8, 2017 from http://www.glossary.oilfield.slb.com/Terms/r/reservoir.aspx.*
Falls, et al.; "Field Test of Cosurfactant-enhanced Alkaline Flooding"; Society of Petroleum Engineers Reservoir Engineering; pp. 217-223; 1994.
Chatzis et al.; "Correlation of capillary number relationship for standstone"; SPE Journal; vol. 29; pp. 555-562; 1989.
Liu et al.; "Favorable Attributes of alkaline-Surfactant-Polymer Flooding"; SPE Journal; pp. 5-16; Mar. 2008.
Stacke; "Anionic Surfactants: Organic Chemistry"; Surfactant Science Series; vol. 56, Ch. 7; pp. 367-459; 1996.

* cited by examiner

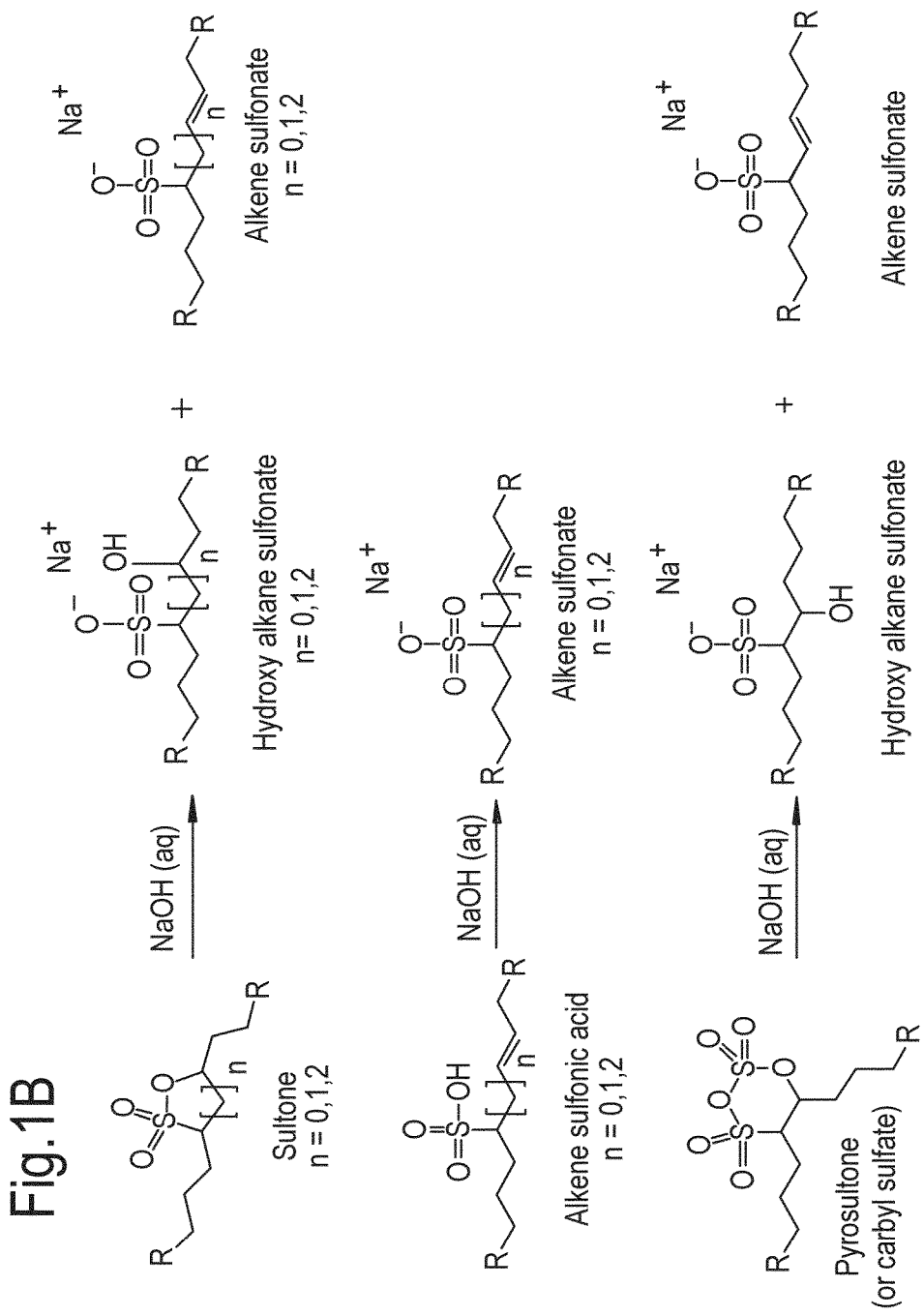

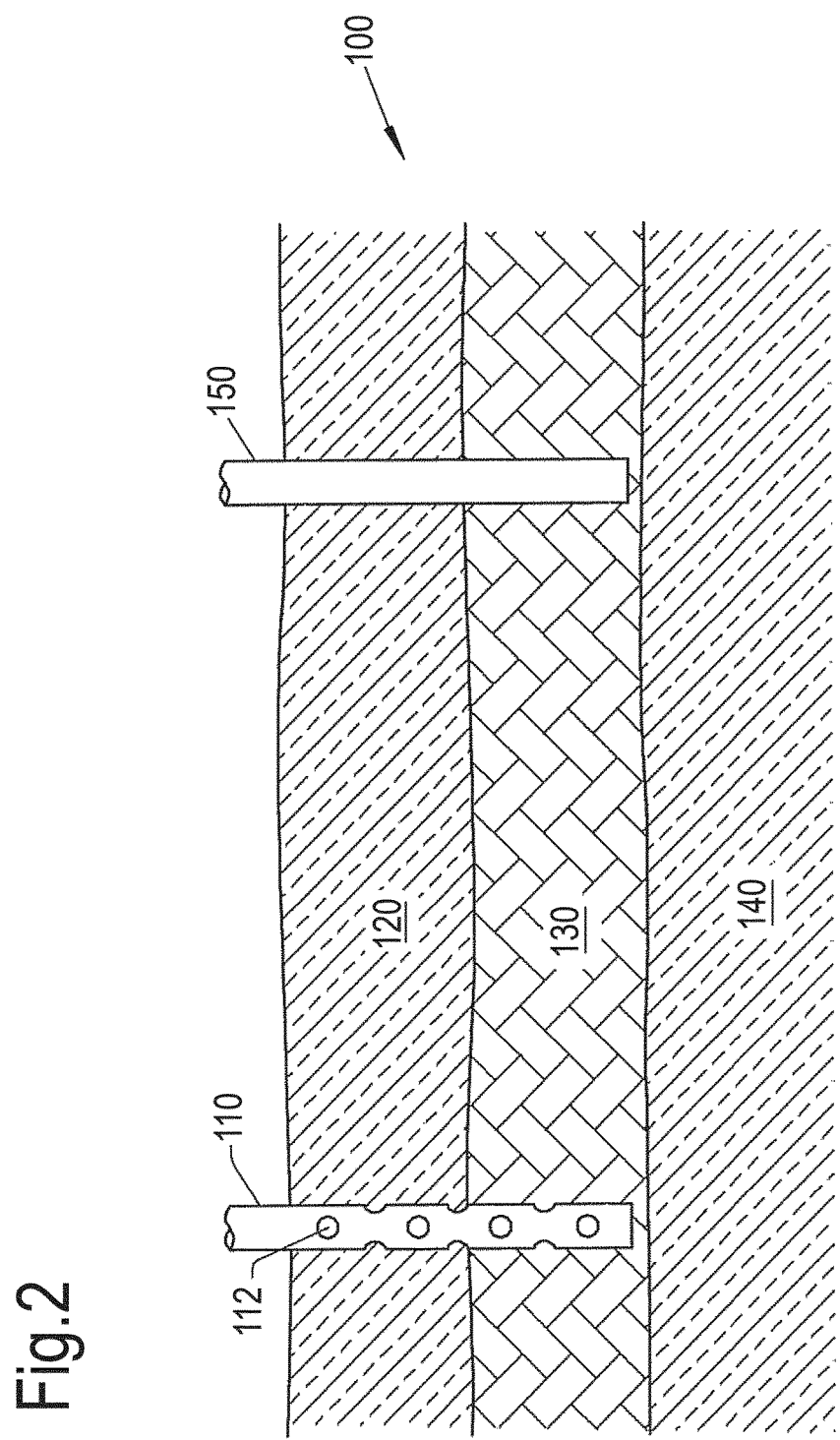

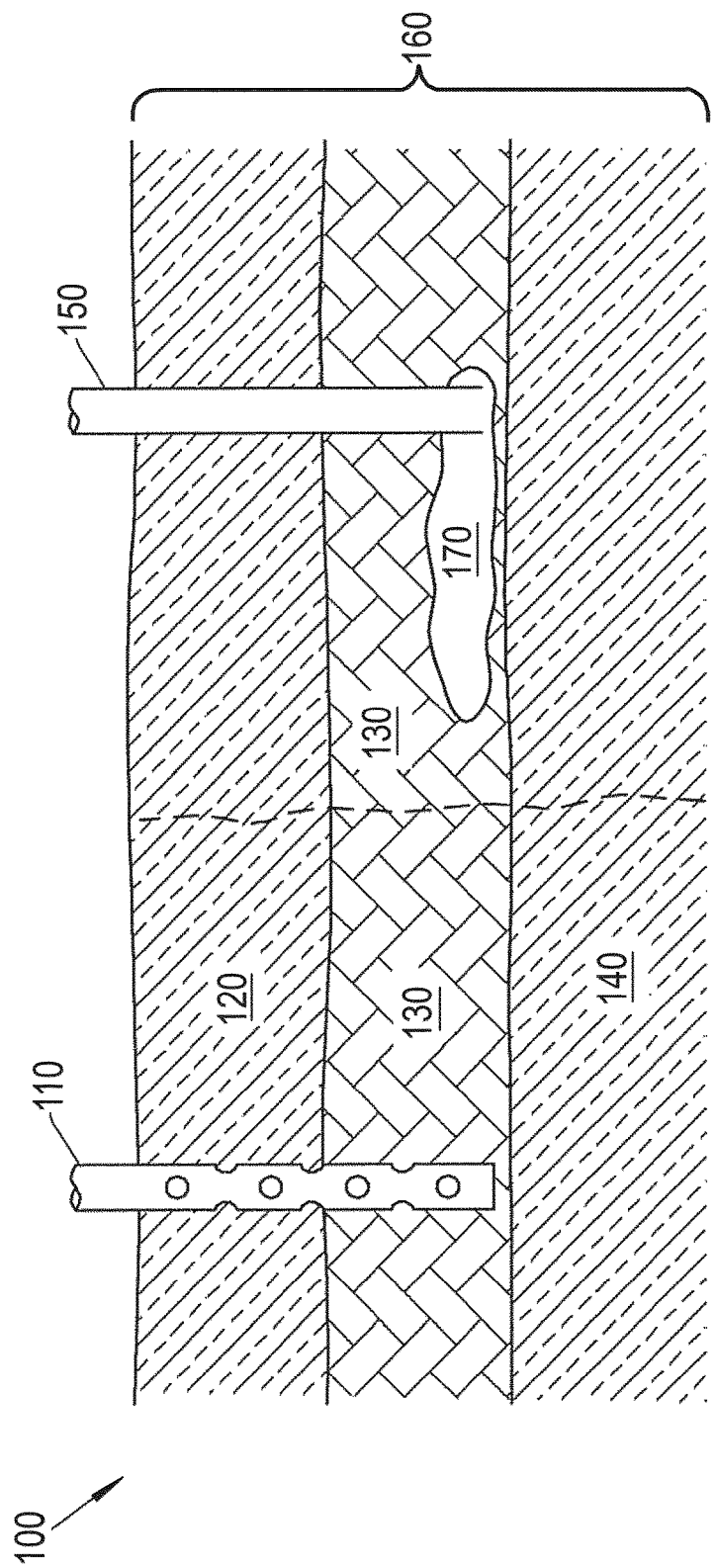

METHOD FOR ENHANCED HYDROCARBON RECOVERY

PRIORITY CLAIM

The present application is the National Stage (§ 371) of International Application No. PCT/EP2013/059567, filed May 8, 2013, which claims priority from European Patent Application No. 12167226.5, filed May 9, 2012, the disclosures of which are incorporated herein by reference.

FIELD OF THE INVENTION

The present invention relates to a method of treating a hydrocarbon containing formation, utilising an internal olefin sulfonate (IOS) as surfactant.

BACKGROUND OF THE INVENTION

Hydrocarbons, such as oil, may be recovered from hydrocarbon containing formations (or reservoirs) by penetrating the formation with one or more wells, which may allow the hydrocarbons to flow to the surface. A hydrocarbon containing formation may have a natural energy source (for example gas, water) to aid in mobilising hydrocarbons to the surface of the wells. For example, water or gas may be present in the formation at sufficient levels to exert pressure on the hydrocarbons to mobilise them to the surface of the production wells. However, reservoir conditions (for example permeability, hydrocarbon concentration, porosity, temperature, pressure) can significantly impact the economic viability of hydrocarbon production from any particular hydrocarbon containing formation. Furthermore, any natural energy sources that exist may become depleted over time, often long before the majority of hydrocarbons have been extracted from the reservoir. Therefore, supplemental recovery processes may be required and used to continue the recovery of hydrocarbons from the hydrocarbon containing formation. Examples of known supplemental processes include waterflooding, polymer flooding, gas flooding, alkali flooding, thermal processes, solution flooding or combinations thereof.

In recent years there has been increased activity in developing new and improved methods of chemical Enhanced Oil Recovery (cEOR) for maximising the yield of hydrocarbons from a subterranean reservoir. In surfactant cEOR the mobilisation of residual oil saturation is achieved through surfactants which generate a sufficiently (ultra) low crude oil/water interfacial tension (IFT) to give a capillary number large enough to overcome capillary forces and allow the oil to flow (Chatzis & Morrows, "Correlation of capillary number relationship for sandstone", SPE Journal, volume 29, pages 555-562, 1989). However, different reservoirs can have very different characteristics (for example crude oil type, temperature, water composition—salinity, hardness etc.), and therefore, it is desirable that the structures and properties of the added surfactant(s) be matched to the particular conditions of a reservoir to achieve the required low IFT. In addition, other important criteria must be fulfilled, such as low rock retention or adsorption, compatibility with polymer, thermal and hydrolytic stability and acceptable cost (including ease of commercial scale manufacture).

Compositions and methods for cEOR utilising an internal olefin sulfonate (IOS) as surfactant are described in U.S. Pat. No. 4,597,879, U.S. Pat. No. 4,979,564, U.S. Pat. No. 5,068,043 and "Field Test of Cosurfactant-enhanced Alkaline Flooding", Falls et al., Society of Petroleum Engineers Reservoir Engineering, 1994.

Savings can be accomplished if a hydrocarbon recovery composition, containing an IOS as a surfactant, is in such a form that it can easily be transported to the hydrocarbon recovery location and then easily stored at that location, and further that at the hydrocarbon recovery location limited equipment is needed to produce the fluid that is provided to the hydrocarbon containing formation.

Surfactants for enhanced hydrocarbon recovery are normally provided to the hydrocarbon containing formation by admixing it with water and/or brine which may originate from the formation from which hydrocarbons are to be recovered, thereby forming a fluid that can be injected into the hydrocarbon containing formation. The surfactant amount in such injectable water containing fluid is generally in the range of from 0.1 to 1 wt. %. See for example "Favorable Attributes of Alkaline-Surfactant-Polymer Flooding", Liu et al., SPE Journal, March 2008, pages 5-16.

Surfactants for enhanced hydrocarbon recovery are normally synthesised at a location which is far remote from the location where hydrocarbons are to be recovered from a hydrocarbon containing formation. This means that the surfactants have to be transported to that hydrocarbon recovery location. Such transport involves high costs. It is desirable to find a way which substantially reduces these costs other than by synthesising the surfactants at the hydrocarbon recovery location itself. The latter option is not cost efficient because in such case there would still be transport involved for surfactants to be provided to other hydrocarbon recovery locations.

Normally, surfactants for enhanced hydrocarbon recovery are transported to a hydrocarbon recovery location and stored at that location in the form of an aqueous solution containing for example 30 to 35 wt. % of the surfactant. At the hydrocarbon recovery location, such solution would then be further diluted to a 0.1-1 wt. % solution as referred to above, before it is injected into a hydrocarbon containing formation. In practice, it is preferred that the surfactant containing aqueous mixtures are not too viscous because then they would be difficult to handle in said transport, storage and dilution. Therefore, in practice, it is not preferred to transport and store more concentrated (for example 60-80 wt. % instead of said 30-35 wt. %) surfactant containing aqueous mixtures because such mixtures are generally highly viscous and therefore difficult to handle in said transport, storage and dilution.

It is important that surfactants for enhanced hydrocarbon recovery are injected into a hydrocarbon containing formation as part of a single-phase solution, because formation of precipitate, liquid crystal or a second liquid phase can lead to non-uniform distribution of injected material and non-uniform transport owing to phase trapping or different mobilities of coexisting phases. This means that a physically stable, that is to say a homogeneous, solid-free surfactant containing solution should be obtained and that such surfactant containing solution should remain homogeneous and solid-free during said transport, storage and dilution.

Therefore, it is desired to find a way which substantially reduces costs for transporting and storing IOS surfactant for enhanced hydrocarbon recovery, while at the same time such IOS surfactant can still be provided to a hydrocarbon containing formation as part of a single-phase solution and still have an acceptable cEOR performance, for example in terms of reducing the IFT, as described above.

SUMMARY OF THE INVENTION

Surprisingly it was found that the above-mentioned objectives are achieved by a method of treating a hydrocarbon containing formation, utilising an internal olefin sulfonate (IOS) as surfactant, wherein prior to transporting the IOS to the location of the hydrocarbon containing formation, sulfonated internal olefin is contacted with a base containing solution in the presence of a non-ionic surfactant, and/or after the latter contacting step but before said transporting step, the IOS and said non-ionic surfactant are combined. That is to say, said non-ionic surfactant may be added in the IOS preparation step which step comprises sulfonating an internal olefin into sulfonated internal olefin followed by contacting sulfonated internal olefin with a base containing solution resulting in the internal olefin sulfonate. Namely, said sulfonated internal olefin may be contacted with the base containing solution in the presence of a non-ionic surfactant, for example through adding said non-ionic surfactant before or during said contacting of sulfonated internal olefin with the base containing solution. Alternatively or additionally, said non-ionic surfactant may be combined with the IOS after the IOS preparation step, for example through addition to the IOS after its preparation.

Accordingly, the present invention relates to a method of treating a hydrocarbon containing formation, comprising the following steps:

a) preparing an internal olefin sulfonate, comprising sulfonating an internal olefin into sulfonated internal olefin followed by contacting sulfonated internal olefin with a base containing solution resulting in the internal olefin sulfonate, wherein sulfonated internal olefin is contacted with the base containing solution in the presence of a non-ionic surfactant, and/or after step a) but before step b), the internal olefin sulfonate and said non-ionic surfactant are combined;

b) transporting an aqueous solution comprising the internal olefin sulfonate and the non-ionic surfactant to the location of the hydrocarbon containing formation;

c) providing the internal olefin sulfonate and the non-ionic surfactant to at least a portion of the hydrocarbon containing formation; and d) allowing the internal olefin sulfonate and the non-ionic surfactant to interact with the hydrocarbons in the hydrocarbon containing formation.

More in particular, it was found that such aqueous solutions comprising internal olefin sulfonate and non-ionic surfactant can be transported as homogeneous, solid-free solutions to the location of the hydrocarbon containing formation, and stored as such for a long period of time. And further that said homogeneous, solid-free solutions can be diluted with water thereby providing diluted single-phase solutions which are suitable for injection into a hydrocarbon containing formation at the hydrocarbon recovery location.

The integrated method of the present invention comprising steps a) to d) is not disclosed or suggested in the prior art.

EP0351928A1 discloses a process for making IOS comprising reacting in a film reactor an internal olefin having from 8 to 26 carbon atoms with a sulfonating agent, in a mol ratio of sulfonating agent to internal olefin of 1:1 to 1.25:1 while cooling the reactor with a cooling means having a temperature not exceeding 35° C., and allowing to neutralize and hydrolyze the reaction product from the sulfonation step.

In EP0351928A1, it is disclosed that in the preparation of internal olefin sulphonates, derived from olefins with more than 14 carbon atoms, it is required that in the neutralization/hydrolysis very intimate mixing of the reactor product and the aqueous base is achieved. Further, it is disclosed that this can be done by e.g. efficient stirring, the addition of a polar cosolvent (lower alcohol) or a phase-transfer agent.

In Examples 1-7 and 13 of EP0351928A1, C13-14 internal olefin is sulfonated. In Examples 8-12, C18 internal olefin is sulfonated. In Example 14, C15-19 internal olefin is sulfonated. After sulfonating the C18 internal olefin, in Examples 11 and 12 (page 5), neutralization and hydrolysis are carried out with an aqueous NaOH solution in the presence of a certain amount of DOBANOL 91-10 which is described as an alcohol mixture of primary, linear C9, C10, and C11 alcohols (weight ratio: 18/50/32) that is ethoxylated to an averaged ethylene oxide number of 10.

However, EP0351928A1 does not mention any application for cEOR.

EP0482687A1 discloses a concentrated liquid, pourable composition which comprises: a) 50-95 wt. % of a C8-C26 IOS surfactant; b) 4-49 wt. % of water; and c) 1-46 wt. % of a lower alcohol, a nonionic surfactant, a polyethylene glycol, a polypropylene glycol, a salt-tolerant anionic surfactant, or a mixture thereof. Said nonionic surfactant may be a C7 to C18-alcohol that is alkoxylated with ethylene oxide and/or propylene oxide with a minimum degree of alkoxylation of 2.

The composition of EP0482687A1 is described as being easily storageable, handlable and transportable. Further, it is mentioned that component c) may be included at the same time when water (i.e. for the neutralization and hydrolysis) is added. This is exemplified in Examples 1-7, wherein a stream of water plus nonionic surfactant was also introduced into the neutralization loop. In Examples 1-6, the nonionic surfactant was Dobanol® 91-10 and in Example 7, it was Dobanol® 23-9. Dobanol® 91-10 is described as a mixture of C9, C10 and C11 primary alcohols (in a weight ratio of 18:50:32), ethoxylated to an average oxyethylene number of 10. Dobanol® 23-9 is described as a mixture of C12 and C13 primary alcohols (in a weight ratio of 42:58), ethoxylated to an average oxyethylene number of 9. The internal olefin feed varied (compositions A, B and C), including a C14-20 internal olefin (composition A).

However, in EP0482687A1, there is neither any reference to an application for cEOR.

GB2138866A discloses a cEOR method wherein the surfactant composition comprises a C10-26 IOS and an ethoxylate which may be a polyoxyethylene alkyl ether (ethoxylated alcohol), wherein the ratio of IOS to ethoxylate is of from 19/1 to 3/7. Said ethoxylated alcohol is further described with reference to a formula (I), and also in the Examples where it is stated, referring to the results shown in Table 2, that the mobility control can be facilitated by the combined use of the IOS with the ethoxylates.

However, GB2138866A does not disclose adding a non-ionic surfactant prior to transporting the IOS to the location of a hydrocarbon containing formation.

WO2009100224 discloses a cEOR method using a composition comprising C17+ IOS, wherein after adding water and/or brine from the formation, a solubilizer is added which comprises an ethoxylated alcohol wherein the alcohol before ethoxylation had an average molecular weight of at least 220. Said solubilizer is described as having a function of preventing phase separation. In the Examples, C20-24 IOS and C24-28 IOS were used in combination with a variety of ethoxylated alcohols.

However, neither WO2009100224 discloses adding a non-ionic surfactant prior to transporting the IOS to the location of a hydrocarbon containing formation.

WO2011098493 discloses a cEOR method using a composition comprising C19-23 IOS. It is disclosed that a solubilising agent may conveniently be added to the composition/brine mixture to keep it as a single phase before it is injected into the formation. For example, the solubilising agent may be an ethoxylated alcohol, e.g. based on an alcohol before ethoxylation having an average molecular weight of at least 220.

However, neither WO2011098493 discloses adding a non-ionic surfactant prior to transporting the IOS to the location of a hydrocarbon containing formation.

BRIEF DESCRIPTION OF THE DRAWINGS

FIG. 1B illustrates the subsequent neutralization and hydrolysis process to form an internal olefin sulfonate.

FIG. 2 relates to an embodiment for application in cEOR.

FIG. 3 relates to another embodiment for application in cEOR.

DETAILED DESCRIPTION OF THE INVENTION

Figure 1A:
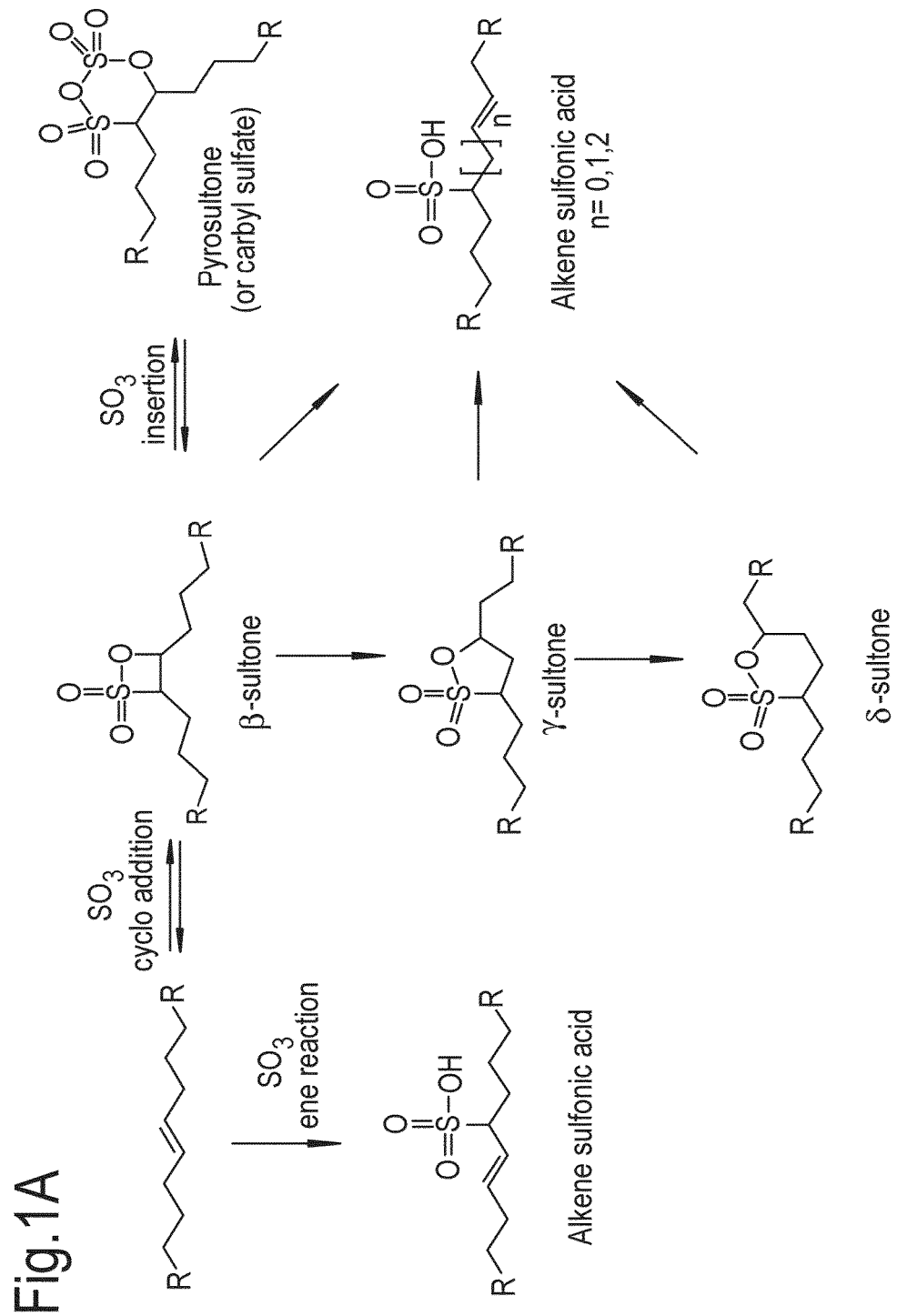
FIG. 1A illustrates the reactions of an internal olefin with sulfur trioxide (sulfonating agent) during a sulfonation process.

Hereinbelow, the present cEOR method is described in more detail.

Internal Olefin Sulfonate (IOS) Preparation

In step a) of the cEOR method of the present invention, an internal olefin sulfonate (IOS) is prepared by a process comprising sulfonating an internal olefin into sulfonated internal olefin followed by contacting sulfonated internal olefin with a base containing solution resulting in the internal olefin sulfonate.

Within the present specification, an internal olefin and an IOS comprise a mixture of internal olefin molecules and a mixture of IOS molecules, respectively. That is to say, within the present specification, "internal olefin" as such refers to a mixture of internal olefin molecules whereas "internal olefin molecule" refers to one of the components from such internal olefin. Analogously, within the present specification, "IOS" or "internal olefin sulfonate" as such refers to a mixture of IOS molecules whereas "IOS molecule" or "internal olefin sulfonate molecule" refers to one of the components from such IOS.

Branched IOS molecules are IOS molecules derived from internal olefin molecules which comprise one or more branches. Linear IOS molecules are IOS molecules derived from internal olefin molecules which are linear, that is to say which comprise no branches (unbranched internal olefin molecules). An internal olefin may be a mixture of linear internal olefin molecules and branched internal olefin molecules. Analogously, an IOS may be a mixture of linear IOS molecules and branched IOS molecules.

Within the present specification, an internal olefin or IOS may be characterised by its carbon number, branched content and/or molecular weight. In case reference is made to an average carbon number, branched content and/or average molecular weight, this means that the internal olefin or IOS in question is a mixture of molecules which differ from each other in terms of carbon number, being branched or unbranched and/or molecular weight.

Within the present specification, said average carbon number is determined by multiplying the number of carbon atoms of each internal olefin molecule or IOS molecule by the weight fraction of that molecule and then adding the products, resulting in a weight average carbon number. The average carbon number may be determined by $^{13}C$ NMR analysis or GC analysis.

Within the present specification, said branched content is determined by dividing the amount of branched molecules by the total amount of branched and unbranched molecules. The branched content may be determined by $^{13}C$ NMR analysis or GC analysis.

Within the present specification, said average molecular weight is determined by multiplying the molecular weight of each internal olefin molecule or IOS molecule by the mole fraction or weight fraction of that molecule and then adding the products, resulting in a number average or weight average molecular weight, respectively. The molecular weight may be determined by GC analysis In the present invention, an internal olefin sulfonate is prepared from an internal olefin in a process comprising at least 2 consecutive steps: sulfonation followed by reaction with a base.

In the sulfonation step, an internal olefin is sulfonated. In the present invention, the internal olefin may have an average carbon number of from 5 to 40, suitably 10 to 35, more suitably 15 to 30, most suitably 18 to 30.

Further, in the present invention, the branched content of the internal olefin used in the sulfonation step may be of from 0.1 to 30 wt. %, preferably 0.5 to 25 wt. %, more preferably 1 to 20 wt. %, most preferably 2 to 15 wt. %. Branches in the above-mentioned internal olefin molecules may include methyl, ethyl and/or higher molecular weight branches including propyl branches.

In the present invention, the number average molecular weight for the internal olefin may vary within wide ranges, such as from 100 to 500, suitably 150 to 450, more suitably 200 to 400 g/mole, most suitably 250 to 350 g/mole.

An IOS molecule is made from an internal olefin molecule whose double bond is located anywhere along the carbon chain except at a terminal carbon atom. Internal olefin molecules may be made by double bond isomerization of alpha-olefin molecules whose double bond is located at a terminal position. Generally, such isomerization results in a mixture of internal olefin molecules whose double bonds are located at different internal positions. The distribution of the double bond positions is mostly thermodynamically determined. Further, that mixture may also comprise a minor amount of non-isomerized alpha-olefins. Still further, because the starting alpha-olefin may comprise a minor amount of paraffins (non-olefinic alkanes), the mixture resulting from alpha-olefin isomerization may likewise comprise that minor amount of unreacted paraffins.

In the present invention, the amount of alpha-olefins in the internal olefin may be up to 5%, for example 1 to 4 wt. % based on total composition. Further, in the present invention, the amount of paraffins in the internal olefin may be up to 2 wt. %, for example up to 1 wt. % based on total composition.

Suitable processes for making an internal olefin include those described in U.S. Pat. No. 5,510,306, U.S. Pat. No. 5,633,422, U.S. Pat. No. 5,648,584, U.S. Pat. No. 5,648,585, U.S. Pat. No. 5,849,960, EP0830315B1 and "Anionic Surfactants: Organic Chemistry", Surfactant Science Series, volume 56, Chapter 7, Marcel Dekker, Inc., New York, 1996, ed. H. W. Stacke.

In the sulfonation step, the internal olefin is contacted with a sulfonating agent. Referring to FIG. 1A, reaction of the sulfonating agent with an internal olefin leads to the formation of cyclic intermediates known as beta-sultones, which can undergo isomerization to unsaturated sulfonic acids and the more stable gamma- and delta-sultones.

Thus, in step a) of the present invention an internal olefin is first sulfonated into sulfonated internal olefin, by contacting the internal olefin with a sulfonating agent, wherein the sulfonated internal olefin preferably comprises sultones and/or sulfonic acids. Then, also in step a), the sulfonated internal olefin is contacted with a base-containing solution resulting in the internal olefin sulfonate.

In the present invention, the sulfonating agent may be sulfur trioxide ($SO_3$), sulfuric acid or oleum. Further, in the present invention, the mole ratio of sulfonating agent to internal olefin may be 0.5:1 to 2:1, more suitably 0.8:1 to 1.8:1, more suitably 1:1 to 1.7:1, most suitably 1:1 to 1.6:1.

In case sulfur trioxide is the sulfonating agent, the sulfur trioxide is preferably provided as a gas stream comprising a carrier gas and the sulfur trioxide. The carrier gas may be air or an inert gas, such as nitrogen. The concentration of sulfur trioxide in said gas stream may be 1 to 10 vol. %, more suitably 2 to 8 vol. %, most suitably 3 to 7 vol. %, based on the volume of the carrier gas.

The sulfonation reaction with $SO_3$ is preferably carried out in a film reactor, for example a "falling-film reactor", where the olefin feed is continuously fed onto the inside surfaces of a tube and gaseous $SO_3$ is fed into the tube to react with the (falling) olefin film in a controlled manner. The reactor may be cooled with a cooling means, which is preferably water, having a temperature preferably not exceeding 90° C., especially a temperature in the range of from 10 to 70° C., more suitably 20 to 60° C., most suitably 20 to 55° C., for example by flowing the cooling means at the outside walls of the reactor. The desired temperature for the cooling means may inter alia depend on the molecular weight and pour point of the feed to and of the reaction mixture in the sulfonation reactor.

The IOS preparation process may be carried out batchwise, semi-continuously or continuously, preferably continuously. In particular, the sulfonation step may be carried out batchwise, semi-continuously or continuously. Preferably, the sulfonation step is carried out continuously.

Preferably, sulfonated internal olefin from the sulfonation step is directly, without removing any molecules, subjected to the reaction with the base. However, between the sulfonation step and the step wherein contacting with a base containing solution is performed in accordance with the present invention, there may still be an intermediate step. Such intermediate step may for example be a step what is generally referred to as "aging", which is commercially applied in the manufacture of alpha-olefin sulfonates. Such aging step may be performed in a way as described by Van Os et al. in "Anionic Surfactants: Organic Chemistry", Surfactant Science Series 56, ed. Stacke H. W., 1996, Chapter 7: Olefin sulfonates, pages 368-369, the disclosure of which is incorporated herein by reference.

In a next step, sulfonated internal olefin from the sulfonation step is contacted with a base containing solution. Referring to FIG. 1B, in this step, beta-sultones are converted into beta-hydroxyalkane sulfonates, whereas gamma- and delta-sultones are converted into gamma-hydroxyalkane sulfonates and delta-hydroxyalkane sulfonates, respectively. Part of said hydroxyalkane sulfonates may be dehydrated into alkene sulfonates.

Thus, referring to FIGS. 1A and 1B, an IOS comprises a range of different molecules, which may differ from one another in terms of carbon number, being branched or unbranched, number of branches, molecular weight and number and distribution of functional groups such as sulfonate and hydroxyl groups. An IOS comprises both hydroxyalkane sulfonate molecules and alkene sulfonate molecules and possibly also di-sulfonate molecules. Hydroxyalkane sulfonate molecules and alkene sulfonate molecules are shown in FIG. 1B. Di-sulfonate molecules (not shown in FIG. 1B) originate from a further sulfonation of for example an alkene sulfonic acid as shown in FIG. 1A.

Within the present specification, "base containing solution" implies that the base is dissolved in a solvent, thereby forming said solution, when the base is contacted with sulfonated internal olefin. Said solvent is thus a solvent for the base.

The base to be contacted with sulfonated internal olefin from the sulfonation step may be a water soluble base, which is preferably selected from the group consisting of hydroxides, carbonates and bicarbonates of an alkali metal ion, such as sodium or potassium, or of an earth alkali metal ion, or of ammonium ion, and amine compounds. Suitable examples are sodium hydroxide and sodium carbonate, most suitably sodium hydroxide. Further, preferably, the solvent for the base is water. Preferably, in this step, sulfonated internal olefin is contacted with an aqueous solution of a water soluble base, such as described hereinabove, especially sodium hydroxide.

The reaction in this step is generally carried out with an excessive molar amount of base. It is preferred that the final internal olefin sulfonate product is not acidic because this may lead to corrosion of process equipment and/or to disintegration of the internal olefin sulfonate. Therefore, it is preferred that the final internal olefin sulfonate product contains a certain amount of base, for example 0.1 to 2 wt. % based on 100% of the active matter. This may be achieved by choosing the amount of base to be added such that the molar ratio of (i) the amount of base fed to the step wherein sulfonated internal olefin is contacted with the base containing solution to (ii) the amount of sulfonating agent (e.g. $SO_3$) fed to the sulfonation step is higher than 1, suitably higher than 1 up to 1.4, more suitably 1.1 to 1.3.

The base and the solvent for the base may be added separately. Preferably, the base is added as part of a solution as described above. Additional solvent may be added separately in addition to such base containing solution. If the base is added as part of a solution, the concentration of the base in such solution, based on total solution, is suitably at most 60 wt. %, more suitably 10 to 55 wt. %, most suitably 20 to 55 wt. %.

The temperature at which sulfonated internal olefin is contacted with the base containing solution in the IOS preparation process may vary within wide ranges, for example 0 to 250° C. Further, the time for the reaction between the base and sulfonated internal olefin may also vary within wide ranges, for example 5 minutes to 4 hours.

The step wherein sulfonated internal olefin is contacted with the base containing solution may be carried out batchwise, semi-continuously or continuously. Preferably, said step is carried out continuously. Further, a continuously stirred tank reactor (CSTR; e.g. a loop reactor) and/or a plug flow reactor may be used in this step.

The step wherein sulfonated internal olefin is contacted with a base containing solution may be carried out as 2 separate, consecutive steps: a "neutralization step" followed by a "hydrolysis" step. In the present specification, "neutralization step" means the step wherein sulfonated internal olefin from the sulfonation step is contacted with a base containing solution for the first time. Further, in the present specification, "hydrolysis step" means the step that may follow after the former "neutralization step". The above features equally apply to said neutralization step and hydrolysis step separately.

In the present invention, the neutralization step may be carried out batchwise or continuously. Preferably, the neutralization step is carried out continuously. Preferably, a CSTR (e.g. a loop reactor) is used in the neutralization step. The hydrolysis step may also be carried out batchwise or continuously. Preferably, the hydrolysis step is carried out continuously. Preferably, a plug flow reactor is used in the hydrolysis step.

The neutralization step is preferably carried out at a temperature in the range of from 0 to 90° C., more preferably 10 to 80° C., more preferably 20 to 70° C., most preferably 30 to 60° C. The neutralization time may be 5 minutes to 4 hours.

Preferably, the product from the neutralization step is directly, without extracting unreacted internal olefin molecules and without removing the base and solvent, subjected to hydrolysis.

In the hydrolysis step, the product from the neutralization step is further reacted through conversion into sulfonate compounds. Said hydrolysis step is therefore preferably carried out at an elevated temperature, for example in order to convert sultones, especially delta-sultones, into active matter. Preferably, the temperature in the hydrolysis step is higher than the temperature in the neutralization step. Preferably, the temperature in the hydrolysis step is higher than 90 to 250° C., more preferably 95 to 220° C., more preferably 100 to 190° C., most preferably 140 to 180° C. The hydrolysis time may be 5 minutes to 4 hours.

U.S. Pat. No. 4,183,867, U.S. Pat. No. 4,248,793 and EP0351928A1, the disclosures of all of which are incorporated herein by reference, disclose processes which can be used to make internal olefin sulfonates in the process of the present invention. Further, the internal olefin sulfonates may be synthesized in a way as described by Van Os et al. in "Anionic Surfactants: Organic Chemistry", Surfactant Science Series 56, ed. Stacke H. W., 1996, Chapter 7: Olefin sulfonates, pages 367-371, the disclosure of which is incorporated herein by reference.

In step a) of the integrated cEOR method of the present invention, sulfonated internal olefin is contacted with the base containing solution in the presence of a non-ionic surfactant, for example through adding said non-ionic surfactant before or during said contacting of sulfonated internal olefin with the base containing solution. In case said non-ionic surfactant is added before said contacting of sulfonated internal olefin with the base containing solution, it may be added to the sulfonated internal olefin or to the base containing solution or to both. Alternatively or additionally, said non-ionic surfactant may be combined with the IOS after said IOS preparation step a) but before step b) of the present invention, which step b) comprises transporting an aqueous solution comprising the IOS and the non-ionic surfactant to the location of the hydrocarbon containing formation.

In the present invention, it has appeared that by contacting sulfonated internal olefin with the base containing solution in the presence of a non-ionic surfactant, resulting in a reaction of the base with sulfonated internal olefin, the mobility of the reaction mixture is advantageously high for it to be handled easily in terms of storage, pumping and mass transfer. An additional advantage of that is that solutions comprising the internal olefin sulfonate and the non-ionic surfactant can be prepared wherein the concentration of the IOS is relatively high as compared to the situation wherein no non-ionic surfactant would be used. Therefore, it is preferred that in the present invention, sulfonated internal olefin is contacted with the base containing solution in the presence of a non-ionic surfactant, that is to say during the IOS preparation step a).

Non-Ionic Surfactant

In the cEOR method of the present invention, the non-ionic surfactant is preferably an alkoxylate of an alcohol having an aliphatic group, more preferably an ethoxylate of such alcohol. Said alcohol may be primary or secondary, preferably primary. Said alcohol alkoxylate may be of the following formula:

$$R-O-[R'-O]_x-H \quad (I)$$

wherein R is the aliphatic group originating from the alcohol, R'—O is an alkylene oxide group, and x represents the number of such alkylene oxide groups.

The non-ionic surfactant of above exemplary formula (I) comprises a range of different molecules which may differ from one another in terms of carbon number for the aliphatic group R, the aliphatic group R being branched or unbranched (linear), nature and number of alkylene oxide groups R'—O, and molecular weight. Thus, the non-ionic surfactant of above exemplary formula (I) comprises a mixture of surfactant molecules. That is to say, within the present specification, "surfactant" as such refers to a mixture of surfactant molecules whereas "surfactant molecule" refers to one of the components from such surfactant.

The weight average carbon number for the aliphatic group R from the optional non-ionic surfactant of above exemplary formula (I) is not essential and may vary within wide ranges, such as from 4 to 25, suitably 6 to 20, more suitably 8 to 15. Further, preferably, said aliphatic group is linear.

The alkylene oxide groups R'—O in above exemplary formula (I) may comprise any alkylene oxide groups. For example, said alkylene oxide groups may comprise ethylene oxide groups, propylene oxide groups and butylene oxide groups or a mixture thereof, such as a mixture of ethylene oxide and propylene oxide groups. In case of a mixture of ethylene oxide and propylene oxide groups, the mixture may be random or blockwise. Preferably, said alkylene oxide groups consist of ethylene oxide groups.

In above exemplary formula (I), x represents the number of alkylene oxide groups R'—O. In the present invention, for the optional non-ionic surfactant of above exemplary formula (I), the average value for x is at least 0.5. Said average value for x may be of from 1 to 20, more suitably 4 to 16, most suitably 7 to 13.

Further, the number average molecular weight for the optional non-ionic surfactant of above exemplary formula (I) may be 300 to 700 g/mole, more suitably 400 to 600 g/mole, most suitably 450 to 550 g/mole.

Examples of commercially available alkoxylated alcohol mixtures include the NEODOL (NEODOL, as used throughout this text, is a trademark) alkoxylated alcohols, sold by Shell Chemical Company, including mixtures of ethoxylates of $C_9$, $C_{10}$ and $C_{11}$ alcohols wherein the average value for the number of the ethylene oxide groups is 8 (NEODOL 91-8 alcohol ethoxylate); mixtures of ethoxylates of $C_{14}$ and $C_{15}$ alcohols wherein the average value for the number of the ethylene oxide groups is 7 (NEODOL 45-7 alcohol ethoxylate); and mixtures of ethoxylates of $C_{12}$, $C_{13}$, $C_{14}$ and $C_{15}$ alcohols wherein the average value for the number of the ethylene oxide groups is 12 (NEODOL 25-12 alcohol ethoxylate)

As mentioned above, such non-ionic surfactant increases mobility, thereby improving intimate mixing of the product from the sulfonation step with the base containing solution. In such way, contact between the organic phase and the base containing aqueous phase is improved. This improves mass transfer and promotes the desired reaction of the sultones and alkene sulfonic acids with the base, and avoids as much as possible the reverse reaction of beta-sultones into internal olefins and $SO_3$. By adding a non-ionic surfactant, efficient stirring becomes less important, which advantageously may result in cost savings. Likewise, it is neither required to add a co-solvent (such as a lower alcohol) in order to improve such intimate mixing. Additionally, the added non-ionic surfactant may also function as a surfactant during the cEOR application which is also part of the present invention, as further discussed below.

As is also mentioned above, it is preferred that in the present invention, in step a), sulfonated internal olefin is contacted with the base containing solution in the presence of a non-ionic surfactant, for example through adding said non-ionic surfactant before or during said contacting of sulfonated internal olefin with the base containing solution. Alternatively or additionally, said non-ionic surfactant may be combined with the IOS after said IOS preparation step a) but before step b) of the present invention, which step b) comprises transporting an aqueous solution comprising the IOS and the non-ionic surfactant to the location of the hydrocarbon containing formation.

Any way, after reaction of sulfonated internal olefin with the base in accordance with the present invention, the internal olefin sulfonate (IOS) product may be diluted, for example by adding additional solvent (e.g. water).

Transport to Hydrocarbon Containing Formation

In step b) of the cEOR method of the present invention, an aqueous solution comprising the IOS and the non-ionic surfactant is transported to the location of the hydrocarbon containing formation.

Said aqueous solution comprising the IOS and the non-ionic surfactant may be the product that results from IOS preparation step a) in a case wherein the solvent for the base containing solution in step a) is water and wherein the non-ionic surfactant is added during IOS preparation step a). Further, it may be the product that results from IOS preparation step a) in a case wherein the solvent for the base containing solution in step a) is water, to which product the non-ionic surfactant is added after step a) but before step b). In all of said cases, the product that results from IOS preparation step a) may be diluted with water, as mentioned above. However, in general, such dilution is advantageously not needed in view of the addition of the non-ionic surfactant, as further described below. The non-ionic surfactant may be added before, during or after said dilution (if any), but any way before step b).

Preferably, the aqueous solution comprising the IOS and the non-ionic surfactant to be transported in step b) of the cEOR method of the present invention, comprises the IOS in an amount of from 10 to 90 wt. %, more preferably 20 to 70 wt. %, most preferably 30 to 50 wt. %, based on total weight of the solution. Preferably, said solution comprises the IOS in an amount of at least 10 wt. %, or at least 20 wt. %, or at least 30 wt. %, or at least 40 wt. %, or at least 50 wt. %, or at least 60 wt. %, based on total weight of the solution. Preferably, said solution comprises the IOS in an amount of at most 90 wt. %, or at most 80 wt. %, or at most 70 wt. %, or at most 60 wt. %, or at most 50 wt. %, or at most 40 wt. %, based on total weight of the solution.

Further, preferably, the aqueous solution comprising the IOS and the non-ionic surfactant to be transported in step b) of the cEOR method of the present invention, comprises water in an amount of from 90 to 10 wt. %, more preferably 70 to 20 wt. %, most preferably 50 to 30 wt. %, based on total weight of the solution. Preferably, said solution comprises water in an amount of at most 90 wt. %, or at most 80 wt. %, or at most 70 wt. %, or at most 60 wt. %, or at most 50 wt. %, or at most 40 wt. %, based on total weight of the solution. Preferably, said solution comprises water in an amount of at least 10 wt. %, or at least 20 wt. %, or at least 30 wt. %, or at least 40 wt. %, or at least 50 wt. %, or at least 60 wt. %, based on total weight of the solution.

Further, in the aqueous solution comprising the IOS and the non-ionic surfactant to be transported in step b) of the cEOR method of the present invention, the amount of non-ionic surfactant may be advantageously relatively low as compared to the amount of the IOS. Preferably, said solution comprises the non-ionic surfactant in an amount of from 0.1 to 50 wt. %, more preferably 0.5 to 30 wt. %, most preferably 1 to 20 wt. %, based on total weight of the IOS. Preferably, said solution comprises the non-ionic surfactant in an amount of at least 0.1 wt. %, or at least 0.5 wt. %, or at least 1 wt. %, or at least 2 wt. %, based on total weight of the IOS. Preferably, said solution comprises the non-ionic surfactant in an amount of at most 50 wt. %, or at most 40 wt. %, or at most 30 wt. %, or at most 20 wt. %, or at most 15 wt. %, based on total weight of the IOS.

The components of the aqueous solution comprising the IOS and the non-ionic surfactant to be transported in step b) of the cEOR method of the present invention, such as the above-mentioned IOS, water and non-ionic surfactant, are to be selected in an overall amount not to exceed 100 wt. %.

In the present invention, it has appeared that when transporting an aqueous, IOS containing solution which also comprises a non-ionic surfactant, said solution remains a homogeneous and solid-free IOS containing solution during transport to and subsequent storage at the location of the hydrocarbon containing formation. An additional advantage of that is that solutions comprising the IOS and the non-ionic surfactant can be transported wherein the concentration of the IOS is relatively high as compared to the situation wherein no non-ionic surfactant would be used. The use of more concentrated IOS containing solutions advantageously involves the transport of substantially smaller volumes of water to hydrocarbon recovery locations which may be very remote from the location where the surfactants were synthesised and/or which hydrocarbon recovery locations may not be easily accessible. Likewise, the storage capacity at those hydrocarbon recovery locations may be reduced and then still be capable of accommodating the reduced volumes of water. Because of this, an enormous cost reduction is achieved by the present invention. Additionally, because in the present cEOR method, the IOS and non-ionic surfactant containing solution remains homogeneous and solid-free there is no need or a reduced need to stir said solutions during transport and subsequent storage.

The use of a non-ionic surfactant in the present invention before transportation step b), as an emulsifier in the aqueous, IOS containing solution, thus improves the physical stability of the final IOS product, preventing separation of phases. This gives handleability advantages for transport and storage of the IOS before it is finally used for cEOR. Phase separation is undesirable since the individual phases have different chemical compositions and therefore different properties and performance, resulting in that such phase separated product would need to be thoroughly re-mixed before application in cEOR. This would cost significant time and money. The emulsifier use of the non-ionic surfactant is particularly important for IOS products with moderate and long carbon chains, such as for example C19-23, C20-24 and C24-28 IOS, since these are less water soluble and have more tendency to phase separate than IOS products with shorter carbon chains. Therefore, in the present invention, the IOS preferably has an average carbon number of from 15 to 35, more preferably 18 to 30.

Oil Recovery: Treating a Hydrocarbon Containing Formation

In steps c) and d) of the cEOR method of the present invention, the transported aqueous solution comprising the IOS and the non-ionic surfactant is applied in cEOR at the location of the hydrocarbon containing formation, more in particular by providing the internal olefin sulfonate and the non-ionic surfactant to at least a portion of the hydrocarbon containing formation and then allowing the internal olefin sulfonate and the non-ionic surfactant to interact with the hydrocarbons in the hydrocarbon containing formation. Said hydrocarbon containing formation may be a crude oil-bearing formation.

Normally, surfactants for enhanced hydrocarbon recovery are transported to a hydrocarbon recovery location and stored at that location in the form of an aqueous solution containing for example 30 to 35 wt. % of the surfactant. At the hydrocarbon recovery location, such solution would then be further diluted to a 0.1-1 wt. % solution as also mentioned in the introductory part of this specification, before it is injected into a hydrocarbon containing formation. In the present invention, after transporting the aqueous solution comprising the IOS and the non-ionic surfactant but before providing said internal olefin sulfonate and non-ionic surfactant to at least a portion of the hydrocarbon containing formation, the solution is preferably diluted with additional water. The amount of water in the fluid to be provided to at least a portion of the hydrocarbon containing formation is suitably of from 99.99 to 95 wt. %, more suitably 99.9 to 99 wt. %, based on the total amount of the fluid.

By such dilution with additional water, an aqueous fluid is formed which fluid can be injected into the hydrocarbon containing formation, that is to say an injectable fluid. The water used in such dilution suitably originates from the formation from which hydrocarbons are to be recovered. Preferably, said water is brine, which is a salt (for example NaCl) containing aqueous solution.

The amount of IOS surfactant, or the total amount of surfactants in case one or more other surfactants are used, in said injectable fluid, may be of from 0.05 to 2 wt. %, preferably 0.1 to 1.5 wt. %, more preferably 0.1 to 1.0 wt. %, most preferably 0.2 to 0.5 wt. %.

In the present invention, the temperature within the hydrocarbon containing formation may be between 10° C. and 150° C., optionally between 30° C. and 90° C. Further, in the present invention, the salinity of the water originating from the hydrocarbon containing formation may be between 0.5% and 20% or between 0.5% and 10% or between 1% and 6%.

Hydrocarbons may be produced from hydrocarbon containing formations through wells penetrating such formations. "Hydrocarbons" are generally defined as molecules formed primarily of carbon and hydrogen atoms such as oil and natural gas. Hydrocarbons may also include other elements, such as halogens, metallic elements, nitrogen, oxygen and/or sulfur. Hydrocarbons derived from a hydrocarbon containing formation may include kerogen, bitumen, pyrobitumen, asphaltenes, oils or combinations thereof.

Hydrocarbons may be located within or adjacent to mineral matrices within the earth. Matrices may include sedimentary rock, sands, silicilytes, carbonates, diatomites and other porous media.

A "hydrocarbon containing formation" may include one or more hydrocarbon containing layers, one or more non-hydrocarbon containing layers, an overburden and/or an underburden. An overburden and/or an underburden includes one or more different types of impermeable materials. For example, overburden/underburden may include rock, shale, mudstone, or wet/tight carbonate (that is to say an impermeable carbonate without hydrocarbons). For example, an underburden may contain shale or mudstone. In some cases, the overburden/underburden may be somewhat permeable. For example, an underburden may be composed of a permeable mineral such as sandstone or limestone. At least a portion of a hydrocarbon containing formation may exist at less than or more than 1000 feet (305 meters) below the earth's surface.

Properties of a hydrocarbon containing formation may affect how hydrocarbons flow through an underburden/overburden to one or more production wells. Properties include porosity, permeability, pore size distribution, surface area, salinity or temperature of formation. Overburden/underburden properties in combination with hydrocarbon properties, capillary pressure (static) characteristics and relative permeability (flow) characteristics may affect mobilisation of hydrocarbons through the hydrocarbon containing formation.

Fluids (for example gas, water, hydrocarbons or combinations thereof) of different densities may exist in a hydrocarbon containing formation. A mixture of fluids in the hydrocarbon containing formation may form layers between an underburden and an overburden according to fluid density. Gas may form a top layer, hydrocarbons may form a middle layer and water may form a bottom layer in the hydrocarbon containing formation. The fluids may be present in the hydrocarbon containing formation in various amounts. Interactions between the fluids in the formation may create interfaces or boundaries between the fluids. Interfaces or boundaries between the fluids and the formation may be created through interactions between the fluids and the formation. Typically, gases do not form boundaries with other fluids in a hydrocarbon containing formation. A first boundary may form between a water layer and underburden. A second boundary may form between a water layer and a hydrocarbon layer. A third boundary may form between hydrocarbons of different densities in a hydrocarbon containing formation.

Production of fluids may perturb the interaction between fluids and between fluids and the overburden/underburden. As fluids are removed from the hydrocarbon containing formation, the different fluid layers may mix and form mixed fluid layers. The mixed fluids may have different interactions at the fluid boundaries. Depending on the interactions at the boundaries of the mixed fluids, production of hydrocarbons may become difficult.

Quantification of energy required for interactions (for example mixing) between fluids within a formation at an interface may be difficult to measure. Quantification of energy levels at an interface between fluids may be determined by generally known techniques (for example spinning drop tensiometer). Interaction energy requirements at an interface may be referred to as interfacial tension. "Interfacial tension" as used herein, refers to a surface free energy that exists between two or more fluids that exhibit a boundary. A high interfacial tension value (for example greater than 10 dynes/cm) may indicate the inability of one fluid to mix with a second fluid to form a fluid emulsion. As used herein, an "emulsion" refers to a dispersion of one immiscible fluid into a second fluid by addition of a compound that reduces the interfacial tension between the fluids to achieve stability. The inability of the fluids to mix may be due to high surface interaction energy between the two fluids. Low interfacial tension values (for example less than 1 dyne/cm) may indicate less surface interaction between the two immiscible fluids. Less surface interaction energy between two immiscible fluids may result in the mixing of the two fluids to form an emulsion. Fluids with low interfacial tension values may be mobilised to a well bore due to reduced capillary forces and subsequently produced from a hydrocarbon containing formation.

Water in a hydrocarbon containing formation may contain minerals (for example minerals containing barium, calcium, or magnesium) and mineral salts (for example sodium chloride, potassium chloride, magnesium chloride). Water salinity and/or water hardness of water in a formation may affect recovery of hydrocarbons in a hydrocarbon containing formation. As used herein "salinity" refers to an amount of dissolved solids in water. "Water hardness", as used herein, refers to a concentration of multivalent ions (for example calcium, magnesium) in the water. Water salinity and hardness may be determined by generally known methods (for example conductivity, titration). As used herein, "high salinity water" refers to water that has greater than 30,000 ppm total dissolved solids based on sodium chloride. As water salinity increases in a hydrocarbon containing formation, interfacial tensions between hydrocarbons and water may be increased and the fluids may become more difficult to produce.

Low salinity water in a hydrocarbon containing formation may enhance hydrocarbon production from a hydrocarbon containing formation. Hydrocarbons and low salinity water may form a well dispersed emulsion due to a low interfacial tension between the low salinity water and the hydrocarbons. Production of a flowable emulsion (for example hydrocarbons/water mixture) from a hydrocarbon containing formation may be more economically viable to a producer. As used herein, "low salinity water" refers to water salinity in a hydrocarbon containing formation that is less than 20,000 ppm total dissolved solids based on sodium chloride. Hydrocarbon containing formations may include water with a salinity of less than 13,000 ppm.

Initially, natural formation pressure and temperature in a hydrocarbon containing formation may be sufficient to cause hydrocarbons to flow into well bores and out to the surface. As hydrocarbons are produced from a hydrocarbon containing formation, pressures and/or temperatures within the formation may decline. Various forms of artificial lift (for example pumps, gas injection) and/or heating may be employed to continue to produce hydrocarbons from the hydrocarbon containing formation.

Mobilisation of residual hydrocarbons retained in a hydrocarbon containing formation may be difficult due to viscosity of the hydrocarbons and capillary effects of fluids in pores of the hydrocarbon containing formation. As used herein "capillary forces" refers to attractive forces between fluids and at least a portion of the hydrocarbon containing formation. Capillary forces may be overcome by increasing the pressures within a hydrocarbon containing formation. Capillary forces may also be overcome by reducing the interfacial tension between fluids in a hydrocarbon containing formation. The ability to reduce the capillary forces in a hydrocarbon containing formation may depend on a number of factors, including the temperature of the hydrocarbon containing formation, the salinity of water in the hydrocarbon containing formation, and the composition of the hydrocarbons in the hydrocarbon containing formation.

As production rates decrease, additional methods may be employed to make a hydrocarbon containing formation more economically viable. Methods may include adding sources of water (for example brine, steam), gases, polymers, monomers or any combinations thereof to the hydrocarbon containing formation to increase mobilisation of hydrocarbons.

In the present invention, the hydrocarbon containing formation is thus treated with the diluted or not-diluted IOS and non-ionic surfactant containing solution, as described above. Interaction of said solution with the hydrocarbons may reduce the interfacial tension of the hydrocarbons with one or more fluids in the hydrocarbon containing formation. The interfacial tension between the hydrocarbons and an overburden/underburden of a hydrocarbon containing formation may be reduced. Reduction of the interfacial tension may allow at least a portion of the hydrocarbons to mobilise through the hydrocarbon containing formation.

The ability of the IOS and non-ionic surfactant containing solution to reduce the interfacial tension of a mixture of hydrocarbons and fluids may be evaluated using known techniques. The interfacial tension value for a mixture of hydrocarbons and water may be determined using a spinning drop tensiometer. An amount of the IOS and non-ionic surfactant containing solution may be added to the hydrocarbon/water mixture and the interfacial tension value for the resulting fluid may be determined.

The IOS and non-ionic surfactant containing solution, diluted or not diluted, may be provided (for example injected in the form of a diluted aqueous fluid) into hydrocarbon containing formation 100 through injection well 110 as depicted in FIG. 2. Hydrocarbon containing formation 100 may include overburden 120, hydrocarbon layer 130, and underburden 140. Injection well 110 may include openings 112 that allow fluids to flow through hydrocarbon containing formation 100 at various depth levels. Hydrocarbon layer 130 may be less than 1000 feet (305 meters) below earth's surface. Low salinity water may be present in hydrocarbon containing formation 100.

The surfactants from the IOS and non-ionic surfactant containing solution may interact with at least a portion of the hydrocarbons in hydrocarbon layer 130. This interaction may reduce at least a portion of the interfacial tension between different hydrocarbons. This may also reduce at least a portion of the interfacial tension between one or more fluids (for example water, hydrocarbons) in the formation and the underburden 140, one or more fluids in the formation and the overburden 120 or combinations thereof.

The surfactants from the IOS and non-ionic surfactant containing solution may interact with at least a portion of hydrocarbons and at least a portion of one or more other fluids in the formation to reduce at least a portion of the interfacial tension between the hydrocarbons and one or more fluids. Reduction of the interfacial tension may allow at least a portion of the hydrocarbons to form an emulsion with at least a portion of one or more fluids in the formation. The interfacial tension value between the hydrocarbons and one or more other fluids may be altered by the IOS and non-ionic surfactant containing solution to a value of less than 0.1 dyne/cm or less than 0.05 dyne/cm or less than 0.001 dyne/cm.

At least a portion of the IOS and non-ionic surfactant containing solution/hydrocarbon/fluids mixture may be mobilised to production well 150. Products obtained from the production well 150 may include components of the IOS and non-ionic surfactant containing solution, methane, carbon monoxide, water, hydrocarbons, ammonia, asphaltenes or combinations thereof. Hydrocarbon production from hydrocarbon containing formation 100 may be increased by greater than 50% after the IOS and non-ionic surfactant containing solution has been added to a hydrocarbon containing formation.

The IOS and non-ionic surfactant containing solution, diluted or not diluted, may also be injected into hydrocarbon containing formation 100 through injection well 110 as depicted in FIG. 3. Interaction of the surfactants from the IOS and non-ionic surfactant containing solution with hydrocarbons in the formation may reduce at least a portion of the interfacial tension between the hydrocarbons and underburden 140. Reduction of at least a portion of the interfacial tension may mobilise at least a portion of hydrocarbons to a selected section 160 in hydrocarbon containing formation 100 to form hydrocarbon pool 170. At least a portion of the hydrocarbons may be produced from hydrocarbon pool 170 in the selected section of hydrocarbon containing formation 100.

It may be beneficial under certain circumstances that an aqueous fluid, wherein the IOS and non-ionic surfactant containing solution is diluted, contains an inorganic salt, such as sodium chloride, potassium chloride, ammonium chloride, sodium sulfate or sodium carbonate. Such inorganic salt may be added separately from the IOS and non-ionic surfactant containing solution or, as discussed above, it may be included in the IOS and non-ionic surfactant containing solution before it is diluted in water. The addition of the inorganic salt may help the fluid disperse throughout a hydrocarbon/water mixture. This enhanced dispersion may decrease the interactions between the hydrocarbon and water interface. The decreased interaction may lower the interfacial tension of the mixture and provide a fluid that is more mobile.

The invention is further illustrated by the following Examples.

EXAMPLES

Sulfonation, using $SO_3$ as the sulfonating agent, of a mixture of isomerized, internal olefins comprising olefins having different carbon numbers falling in the range of from 20 to 24 was carried out in a falling-film sulfonation reactor under the conditions mentioned in Table 1 below.

TABLE 1

| Sulfonation conditions | |
| --- | --- |
| Molar $SO_3$ to olefin ratio | 1.06 |
| Cooling water temperature, upper third of reactor, ° C. | 15 |
| Cooling water temperature, lower 2 sections of reactor, ° C. | 25 |
| Olefin flow rate, g/min | 3.1 |
| Nominal (basis target) percent active matter | 30 |

The sulfonated product coming from the sulfonation reactor was then neutralized during which said product was contacted with a base containing solution (i.e. an aqueous NaOH containing solution; 15% molar excess of NaOH). Further, no N91-8, 5% of N91-8 or 10% of N91-8 was added, so that in the latter two cases, said neutralization was performed in the presence of said N91-8. By said "N91-8" reference is made to a commercially available alkoxylated alcohol mixture, sold by Shell Chemical Company, namely NEODOL 91-8 alcohol ethoxylate which is a mixture of ethoxylates of $C_9$, $C_{10}$ and $C_{11}$ alcohols wherein the average value for the number of the ethylene oxide groups is 8. Said percentages of 5% and 10% of N91-8 were reckoned on 100% active matter basis. The neutralized samples were then hydrolyzed under the conditions mentioned in Table 2 below, resulting in a mixture containing water and the internal olefin sulfonate (IOS).

TABLE 2

| Hydrolysis conditions | |
| --- | --- |
| Temperature, ° C. | 160 |
| Residence time, hours | 4 |
| Stir rate, rpm | 1000 |

Still further, in the case where no N91-8 had been added, either 5% of N91-8 or 10% of N91-8 was added after the final (hydrolysis) step. Then the 4 cases were evaluated and compared, the results of which are included in Table 3 below.

TABLE 3

| N91-8 added during neutralization? | N91-8 added after hydrolysis? | Amount N91-8, wt. % | IOS properties |
| --- | --- | --- | --- |
| yes | no | 5 | Examples of the invention |
| yes | no | 10 | After hydrolysis, uniform appearing, flowable aqueous IOS-containing mixtures without phase separation were obtained. After standing for 5 days, both mixtures (5% and 10%) did not separate into distinct phases. |
| no | yes | 5 | Comparative Examples |
| no | yes | 10 | After hydrolysis, phase-separated aqueous IOS-containing mixtures were obtained. Addition of N91-8 after hydrolysis, followed by high shear mixing yielded uniform appearing, flowable mixtures without phase separation. However, after standing for 5 days, both mixtures (5% and 10%) separated again into two distinct phases. |

From the table above, it clearly appears that by contacting sulfonated internal olefin with the base containing solution in the presence of a non-ionic surfactant, such as said N91-8, an IOS is obtained which surprisingly has a higher physical stability, also in the long term, in an aqueous mixture (solution) containing such IOS, thereby preventing separation of phases, as compared to a case wherein such non-ionic surfactant is only added after having prepared the IOS, for example after the above hydrolysis step. As discussed in the description preceding these Examples, such higher stability inter alia gives handleability advantages for transport and storage of the IOS before it is finally used for cEOR.

That which is claimed is:

1. A method of treating a hydrocarbon containing formation, comprising the following steps:
 a) preparing an internal olefin sulfonate, comprising sulfonating an internal olefin into sulfonated internal olefin followed by contacting sulfonated internal olefin with a base containing solution resulting in the internal olefin sulfonate, wherein sulfonated internal olefin is contacted with the base containing solution in the presence of a non-ionic surfactant wherein the non-ionic surfactant is an alkoxylate of an alcohol having an aliphatic group wherein the weight average carbon number for the aliphatic group is from 6 to 20;

b) transporting an aqueous solution comprising the internal olefin sulfonate and the non-ionic surfactant to a location of the hydrocarbon containing formation;

c) providing the internal olefin sulfonate and the non-ionic surfactant to at least a portion of the hydrocarbon containing formation; and d) allowing the internal olefin sulfonate and the non-ionic surfactant to interact with hydrocarbons in the hydrocarbon containing formation.

2. A method according to claim 1, wherein the non-ionic surfactant is an ethoxylate.

3. A method according to claim 2, wherein the ethoxylate of an alcohol is of the formula R—O—[R'—O]$_x$H wherein R is the aliphatic group originating from the alcohol, R'—O is an alkylene oxide group, and x represents the number of such alkylene oxide groups.

4. A method according to claim 1, wherein the aqueous solution comprising the internal olefin sulfonate and the non-ionic surfactant to be transported in step b), comprises the internal olefin sulfonate in an amount of from 10 to 90 wt. % based on the total weight of the aqueous solution.

5. A method according to claim 1, wherein the aqueous solution comprising the internal olefin sulfonate and the non-ionic surfactant to be transported in step b), comprises water in an amount of from 90 to 10 wt % based on the total weight of the aqueous solution.

6. A method according to claim 1, wherein the aqueous solution comprising the internal olefin sulfonate and the non-ionic surfactant to be transported in step b), comprises the non-ionic surfactant in an amount of from 0.1 to 50 wt. % based on the total weight of the aqueous solution.

7. A method according to claim 1, wherein the aqueous solution comprising the internal olefin sulfonate and the non-ionic surfactant to be transported in step b), comprises the internal olefin sulfonate in an amount of from 20 to 70 wt. % based on total weight of the solution.

8. A method according to claim 1, wherein the aqueous solution comprising the internal olefin sulfonate and the non-ionic surfactant to be transported in step b), comprises the internal olefin sulfonate in an amount of from 30 to 50 wt. %, based on total weight of the solution.

9. A method according to claim 1, wherein the aqueous solution comprising the internal olefin sulfonate and the non-ionic surfactant to be transported in step b), comprises water in an amount of from 70 to 20 wt. % based on total weight of the solution.

10. A method according to claim 1, wherein the aqueous solution comprising the internal olefin sulfonate and the non-ionic surfactant to be transported in step b), comprises water in an amount of from 50 to 30 wt. %, based on total weight of the solution.

11. A method according to claim 1, wherein the aqueous solution comprising the internal olefin sulfonate and the non-ionic surfactant to be transported in step b), comprises the non-ionic surfactant in an amount of from 0.5 to 30 wt. % based on total weight of the internal olefin sulfonate.

12. A method according to claim 1, wherein the aqueous solution comprising the internal olefin sulfonate and the non-ionic surfactant to be transported in step b), comprises the non-ionic surfactant in an amount of from 1 to 20 wt. %, based on total weight of the internal olefin sulfonate.

13. A method according to claim 1 wherein the weight average carbon number for the aliphatic group is from 8 to 15.

14. A method according to claim 1 wherein the average number of alkylene oxide groups in the alkoxylate is from 4 to 16.

15. A method according to claim 1 wherein the average number of alkylene oxide groups in the alkoxylate is from 7 to 13.

* * * * *